United States Patent [19]

Winter et al.

[11] Patent Number: 4,508,423

[45] Date of Patent: Apr. 2, 1985

[54] METHOD AND APPARATUS FOR ASSEMBLING AN OPTICAL FIBER COMMUNICATION CABLE

[75] Inventors: Joseph Winter, New Haven; Michael J. Pryor, Woodbridge, both of Conn.

[73] Assignee: Olin Corporation, New Haven, Conn.

[21] Appl. No.: 413,846

[22] Filed: Sep. 1, 1982

Related U.S. Application Data

[63] Continuation-in-part of Ser. No. 324,242, Nov. 23, 1981.

[51] Int. Cl.³ ............................................... G02B 5/14
[52] U.S. Cl. .................................................. 350/96.23
[58] Field of Search ...................................... 350/96.23

[56] References Cited

U.S. PATENT DOCUMENTS

| | | | |
|---|---|---|---|
| 3,955,878 | 5/1976 | Nowak | 350/96 R |
| 4,118,594 | 10/1978 | Arnaud | 350/96.23 |
| 4,146,302 | 3/1979 | Jachimowicz | 350/96.23 |
| 4,201,607 | 5/1980 | Rautenberg et al. | 350/96.23 |
| 4,212,097 | 7/1980 | Portinari et al. | 350/96.23 |
| 4,232,935 | 11/1980 | Rohner et al. | 350/96.23 |
| 4,239,336 | 12/1980 | Parfree et al. | 350/96.23 |
| 4,257,675 | 3/1981 | Nakagome et al. | 350/96.23 |
| 4,275,294 | 6/1981 | Davidson | 350/96.23 |
| 4,278,835 | 7/1981 | Jackson | 350/96.23 |
| 4,279,470 | 7/1981 | Portinari et al. | 350/96.23 |
| 4,288,144 | 9/1981 | Nakai et al. | 350/96.23 |
| 4,317,003 | 2/1982 | Gray | 174/106 R |
| 4,372,792 | 2/1983 | Dey et al. | 350/96.23 |

FOREIGN PATENT DOCUMENTS

| | | | |
|---|---|---|---|
| 2507649 | 2/1975 | Fed. Rep. of Germany | 350/96.23 |
| 2507648 | 2/1976 | Fed. Rep. of Germany | 350/96.23 |
| 3141636 | 11/1983 | Fed. Rep. of Germany | 350/96.23 |
| 1558274 | 12/1979 | United Kingdom | 350/96.23 |
| 1583520 | 1/1981 | United Kingdom | 350/96.23 |
| 1586007 | 3/1981 | United Kingdom | 350/96.23 |

OTHER PUBLICATIONS

Wilkins, G. A., "How Small Can an Electro-Optical Transoceanic Cable Be?", International Telemetry Society Conference, San Diego, California, 10/13-15/81.
Wilkins, G. A. et al., "Design and Performance of an Undersea, Single-Fiber Multi-Repeater, Full Duplex, Electro-Optical Data Link", International Telemetry Society Conference, San Diego, California, 10/13-15/81.
Wilkins, G. A., "Guidelines to the Design of Optical Cables", ASME Winter Annual Meeting, New York, New York, 12/2-7/79.
Wilkins, G. A., "An Electro-Optical Array Support Cable", ASME Winter Annual Meeting, Chicago, Illinois, 11/16-20/80.
Wilkins, G. A., "Recent Experience with Small, Undersea, Optical Cables", IEEE-EASCON, Washington, D.C., 10/79.
Begeman, M. L. et al., *Manufacturing Processes*, Sixth Edition, John Wiley and Sons, Inc., 1957, pp. 283-285.

*Primary Examiner*—William L. Sikes
*Assistant Examiner*—Robert E. Wise
*Attorney, Agent, or Firm*—Barry L. Kelmachter; Howard M. Cohn; Paul Weinstein

[57] ABSTRACT

A method and apparatus for assembling an optical fiber communication cable comprises forming a tubular member out of a strip of metal or metal alloy and sealing the tubular member. After the tubular member has been sealed, at least one optical fiber and a cushioning material are deposited into the member.

47 Claims, 7 Drawing Figures

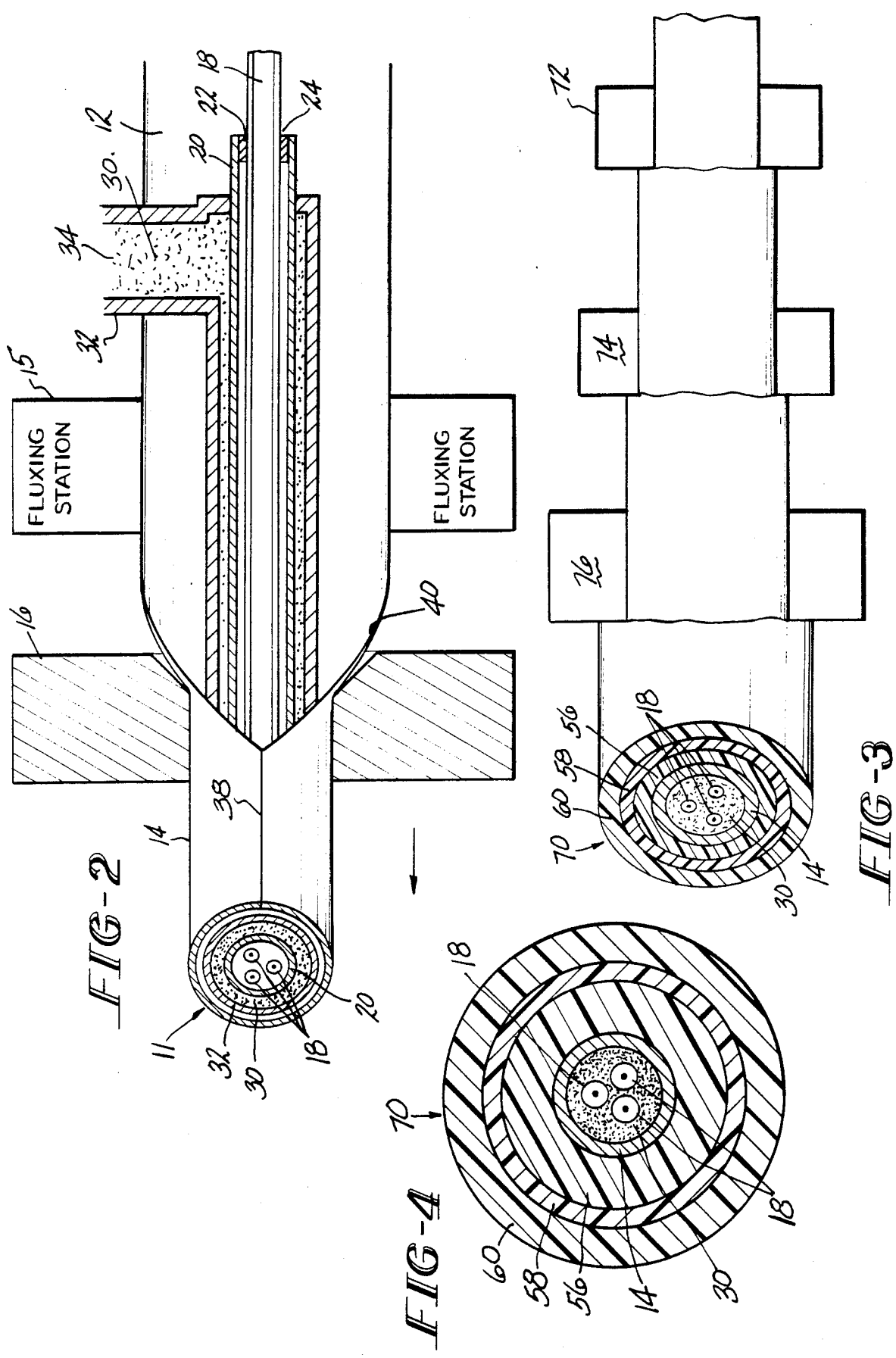

METHOD AND APPARATUS FOR ASSEMBLING AN OPTICAL FIBER COMMUNICATION CABLE

This application is a continuation-in-part of U.S. patent application Ser. No. 324,242 filed Nov. 23, 1981 to Winter et al.

The invention disclosed herein relates to a method and apparatus for assembling an optical fiber communication cable. The cable produced by the instant invention has utility in underground, undersea, and other communication applications.

The advent of optical fibers for use in communication applications has permitted construction of relatively small diameter cables. Generally, optical fiber communication cables are designed to provide all of the required electrical, optical, and physical functions within the smallest possible diameter. Additionally, it is desirable that the cable be constructed to have a relatively long uninterrupted length and good flexibility characteristics. Furthermore, in undersea applications, the cable has to withstand stresses induced by hydrostatic pressure, temperature, and sea action.

An optical fiber communication cable generally consists of several layers of appropriate plastic materials such as polyethylene, polyimide, polyamide, KEVLAR filaments in an epoxy matrix, or other similar plastics encapsulating a strengthening layer within which a dielectric layer is used to protect an inner tube or cable core. This inner tube or cable core is frequently made of materials which allow it to be used as a tubular conductor. When used in undersea applications, the core often contains an appropriate polyethylene or other long chain plastic gel material to help position one or more glass optical fibers. Typical optical cable constructions are those shown and discussed in U.S. Pat. Nos. 3,955,878 to Nowak, 4,118,594 to Arnaud, 4,146,302 to Jachimowicz, 4,201,607 to Rautenberg et al., 4,212,097 to Portinari et al., 4,239,336 to Parfree et al., 4,232,935 to Rohner et al., 4,257,675 to Nakagome et al., 4,275,294 to Davidson, 4,278,835 to Jackson, 4,279,470 to Portinari et al., and 4,288,144 to Nakai et al., in German Offenlegungsschrift No. 2,507,649 to Tscharntke, in "Guidelines to the Design of Optical Cables" by Wilkins, presented at the Winter Annual Meeting, Dec. 2–7, 1979 of the American Society of Mechanical Engineers, in "An Electro-Optical Array Support Cable" by Wilkins, presented at the Winter Annual Meeting, Nov. 16–20, 1980 of the American Society of Mechanical Engineers, in "Recent Experience with Small, Undersea Optical Cables" by Wilkins, IEEE-EASCON, October, 1979, Washington, D.C., in "How Small Can an Electro Optical Cable Be?" by Wilkins, International Telemetry Society Conference, San Diego, Calif., Oct. 13–15, 1981 and in "Design and Performance of an Undersea, Single-Fiber, Multi-Repeater, Full Duplex, Electro-Optical Data Link", by Wilkins et al., International Telemetry Conference, San Diego, Calif., Oct. 13–15, 1981.

Various approaches for assembling these optical cables are known in the art. One approach places optical fibers within a split aluminum tube. A copper tube made from copper tape is then formed over the aluminum tube and fibers so as to provide a hermetic seal. Thereafter, the copper tube may be surrounded by a dielectric layer, a strength member layer, and a sheath. An alternative to this approach surrounds the aluminum tube and optical fibers with a copper tape layer, a dielectric layer, and a sheath. U.S. Pat. No. 4,239,336 to Parfree et al. is illustrative of these approaches.

In a second approach, a metal tube is manufactured such as by extrusion or rolling over a metal strip. The tube is slit open and one or more optical fibers are inserted into the tube. If desired, a void filling gel may be inserted along with the fiber or fibers. The tube is then squeezed shut and the slit permanently closed as by welding. The tube is finally surrounded by a dielectric layer, a loadbearing section, and an outer jacket. Illustrative of this approach is "An Electro-Optical Array Support Cable" by Wilkins and U.S. Pat. No. 4,275,294 to Davidson. A similar approach is shown in U.S. Pat. Nos. 4,212,097 and 4,279,470, both to Portinari et al.

Yet another approach known in the art rolls an electrical conductor tube from a flat-tape stock of copper material. Prior to tube closure, the optical fiber or fibers and/or a void filler or pressure buffer layer are inserted into the tube channel. The tube is then forced shut and permanently welded or soldered. Additional layers consisting of synthetic materials and containing high tensile strength materials may be used to cover the conductor tube. Illustrative of this type of approach are U.S. Pat. Nos. 4,146,302 to Jachimowicz, 4,232,935 to Rohner et al. and 4,257,675 to Nakagome et al.

The fabrication of optical communication cables by these approaches has been hampered by an inability to get extremely long uninterrupted lengths of assembled cable. Furthermore, the tube has to be threaded with one or more glass conductor rods or fibers whose diameter is approximately $\frac{1}{8}$ mm. Frequently, kinking or breaking of one or more of the fibers occurs during threading, resulting in non-usable cable. In addition, damage to the fibers may occur during the tube sealing operation. If the fiber threading operation is successful, the problem of filling the tube with the appropriate filler while maintaining the fibers in reasonable separation still remains.

One approach for resolving these fabrication problems is shown in co-pending U.S. patent application Ser. No. 272,154 filed June 10, 1981 to Winter et al. for a METHOD AND APPARATUS FOR ASSEMBLING AN OPTICAL FIBER COMMUNICATION CABLE, now abandoned. In the Winter et al. application, the cable core is assembled by pulling a strip of metal or metal alloy through a die to form a tubular conductor and simultaneously inserting at least one optical fiber and the cushioning material into the forming tubular conductor. Thereafter, in a first embodiment, the tubular conductor seam is welded or soldered to provide the desired degree of hermeticity. In a second embodiment, the tubular conductor is encased within a locking sheath.

It has been discovered that when the cushioning material is present in the tubular conductor during the sealing operation, it sometimes flows into the seam being closed. This seepage of cushioning material into the seam can adversely affect the seal formed by soldering or welding. As a result, the tubular conductor does not have the desired degree of hermeticity.

In accordance with the instant invention, there is provided an improved method and apparatus for assembling an optical fiber communication cable. The method of assembly according to the instant invention comprises forming a tubular member from a strip of metal or metal alloy, sealing the tubular member, and releasing into the sealed tubular member one or more optical fibers. By releasing the one or more optical fibers into the tubular member after the sealing operation has been completed, the likelihood of damaging the fiber or fibers is minimized.

More particularly, the method of assembly in accordance with the instant invention comprises pulling a strip of metal or metal alloy through a flux applying station and then through a die to form a tubular member having a substantially square and tight seam. After the forming operation, the tubular member is passed through a station for sealing the seam. During the seam sealing operation, one or more optical fibers and/or a cushioning material are housed within a protective sheath located internally of the tubular member. The protective sheath substantially prevents the transmission of heat from the sealing operation to the one or more optical fibers and/or the cushioning material, prevents any cushioning material from adversely affecting the seam sealing operation, and in general, protects the optical fiber or fibers. After the sealing of the seam has been completed, the fiber or fibers and/or the cushioning material are released into the tubular member. In a first embodiment, the optical fiber or fibers are released into the tubular member downstream of the location where the cushioning material is released into the sealed tubular member. In a second embodiment, the optical fiber or fibers are released into the sealed tubular member simultaneously with the cushioning material. In a third embodiment, the optical fiber or fibers are released into the sealed tubular member without any cushioning material.

If desired, the tubular member forming the core may be used as an electrical conductor for transmitting power. Alternatively, the tubular member may be used solely as a strength member.

After the core has been fabricated, it may be surrounded by one or more additional layers. The additional layer or layers may comprise a dielectric layer, a loadbearing layer, and/or an outer covering.

The apparatus for assembling an optical fiber communication cable in accordance with the instant invention includes a capillary means or protective sheath for releasing the one or more optical fibers into the tubular member after the sealing operation has been completed. In a first embodiment, the capillary means comprises concentric chambers or passageways for inserting both a cushioning material and the one or more optical fibers into the sealed tubular member. Preferably, one of the concentric chambers or passageways extends into the tubular member farther than the other. In a preferred embodiment, the capillary means inserts the one or more optical fibers into the tubular member downstream of the location where the cushioning material is injected into the sealed tubular member. In a second embodiment, the capillary means comprises a single passageway or chamber for substantially simultaneously inserting the cushioning material and the one or more optical fibers into the tubular member. In a third embodiment, the capillary means comprises a single passageway or chamber for inserting one or more optical fibers into the sealed tubular member without any cushioning material.

To substantially prevent the transmission of heat from the seam sealing operation to the one or more fibers and/or the cushioning material, the capillary means or protective sheath is preferably formed from a material having a relatively low thermal conductivity. In addition, the capillary means or protective sheath should be formed from a material that will not be bonded to the tubular member by the means for sealing the seam and that can withstand the temperatures associated with the seam sealing. Suitable materials for forming the capillary means include high stainless steels, refractory alloys, ceramics and insulating materials. Alternatively, the capillary means may be formed from composite materials. The composite may comprise an outer material having a low thermal conductivity and an inner material having a higher thermal conductivity.

If desired, the capillary means may be joined to an external cooling system. By doing this, heat within the capillary means may be readily withdrawn.

The cable produced by the method and apparatus of the instant invention should have a relatively small diameter and good flexibility characteristics. This cable should also be capable of resisting sea action and of withstanding the pressures and temperatures associated with undersea applications. In addition, the cable produced by the method and apparatus of the instant invention is capable of being level wound on a storage reel, of being stored on a reel with a minimum total volume and of having relatively long uninterrupted lengths.

It is an object of the present invention to provide a method and apparatus for assembling an optical fiber communication cable having a relatively small diameter.

It is a further object of the present invention to provide a method and apparatus as above for assembling an optical fiber communication cable having a relatively long uninterrupted length.

It is a further object of the present invention to provide a method and apparatus as above for assembling an optical fiber communication cable having a sealed tubular core with a relatively high degree of hermeticity.

It is a further object of the present invention to provide a method and apparatus as above for inserting one or more optical fibers into the tubular core after the sealing operation has been completed so that the risk of damage to the fiber or fibers are minimized.

It is a further object of the present invention to provide a method and apparatus as above for inserting a cushioning material about the fiber or fibers, if desired, without adversely affecting the sealing of the tubular core.

These and other objects will become more apparent from the following description and drawings.

Embodiments of the method and apparatus for assembling the optical fiber communication cable and the cable produced by the instant invention are shown in the drawings wherein like numerals depict like parts.

FIG. 2 is a schematic representation in partial cross section of a bottom view of a portion of the apparatus of FIG. 1.

FIG. 3 is a schematic representation in partial cross section of the apparatus used to fabricate the outer layers of an optical fiber communication cable.

FIG. 4 is a schematic representation in cross section of a first cable embodiment produced in accordance with the instant invention.

In accordance with this invention, a method and apparatus for assembling an optical fiber communication cable are provided. The instant method of assembly makes use of a tube forming technique to permit assembly of a cable having a core comprising a metal or metal alloy tubular member having a relatively small diameter and a relatively long uninterrupted length. The cable produced by the instant method and apparatus should satisfy all electrical, physical, and operational constraints for underground, undersea, and other uses.

Furthermore, the instant method and apparatus permit production of a relatively small diameter cable having a core exhibiting excellent strength and flexibility characteristics. The cable produced by the instant method and apparatus may have a diameter substantially about one-fourth that of a conventional cable and a transportation volume substantially about one-tenth that of a conventional cable.

The method of assembling the optical fiber communication cable of the instant invention is relatively inexpensive and simple to perform. The instant method readily solves the problem of forming, filling, and sealing a tubular member with negligible risk to the fiber or fibers within the member. It also produces a tubular member that is substantially free of internal and external rough spots, both substantially circular and concentric, substantially clean on both the internal and external surfaces before, during, and after tube fabrication, and capable of being used as an electrical conductor.

Figure 1:
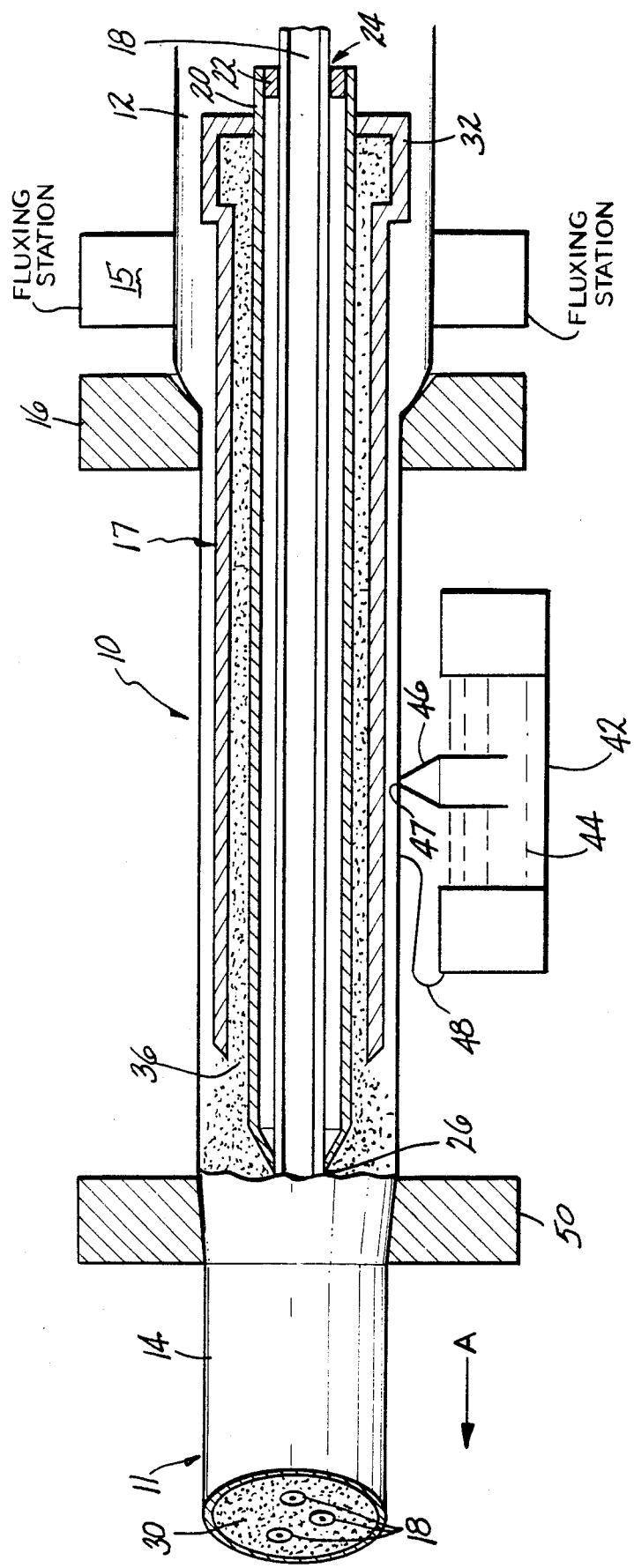
FIG. 1 is a schematic representation in partial cross section of a side view of an apparatus used to assemble a first type of optical fiber communication cable core having one or more optical fibers and a cushioning material.

Referring now to FIGS. 1–3, an apparatus 10 is shown for assembling a first type of cable core 11 that is particularly useful in undersea applications. The apparatus 10 takes a strip 12 of metal or metal alloy and forms it into a tubular member 14 by pulling the strip through a forming die 16. The use of a die to form a tube from strip material is well known in the art. *Manufacturing Processes*, Sixth Edition, by Myron L. Begeman et al., John Wiley and Sons, Inc., 1957, pp. 283–285, discloses various dies for forming a tube out of strip material. Any suitable die arrangement may be utilized. However, prior to passing through die 16, strip 12 is passed through a fluxing station 15. Fluxing station 15 applies a flux to the edges of the strip 12. Fluxing station 15 may comprise any conventional means for applying any conventional flux known in the art. Preferably, the tubular member 14 is formed with a longitudinal seam 38 having square and tight edges 40. While the seam 38 may be formed on any side, preferably seam 38 faces downwardly. Any suitable means such as a take-up reel not shown may be used to pull strip 12 through fluxing station 15 and die 16.

After the tubular member 14 has been formed by the die 16, it is passed to a station 42 for sealing the seam 38. Station 42 may comprise any suitable sealing mechanism, i.e. soldering means, welding means, brazing means, etc. known in the art. In a preferred arrangement, station 42 comprises means for soldering the seam 38.

A supply of solder is provided in a sump or bath 44. The solder is fed in a conventional manner, such as by a pump not shown, to a soldering head 46 having an orifice 47. The solder is preferably fed through the soldering head 46 and orifice 47 at a pressure sufficient to create a spout of solder. The tubular member 14 and the seam 38 are passed over the spout of solder. The movement of the tubular member over the spout of solder and surface tension drive the solder into the seam interface formed by the edges 40. The solder capillaries up into and substantially fills the seam 38. After the solder solidifies, the tubular member 14 is completely sealed. By sealing the tubular member in this fashion, the tubular member may be provided with a relatively high degree of hermeticity. Any suitable solder including silver solders, high-temperature solders, low-temperature solders such as lead-tin solder, lead-antimony solder, tin-antimony solder, etc., may be used to seal seam 38 and tubular member 14.

After passing over the soldering head 46, tubular member 14 passes over a wiping device 48 for removing any excess solder. Wiping device 48 may comprise a spring wipe or any other suitable wiping mechanism.

During the tubular member forming and sealing operations, at least one optical fiber 18 and a cushioning material 30 are located within a protective sheath or capillary means 17. The tube forming operation preferably takes place about the protective sheath or capillary means 17. The capillary means 17 is intended to prevent damage to the at least one fiber 18 and cushioning material 30 from the sealing operation and to prevent the cushioning material from seeping into the seam and adversely affecting the sealing operation. After the solder has solidified and the tubular member 14 has been sealed, at least one optical fiber 18 and a cushioning material 30 are inserted into the tubular member. As used herein, the term inserted means released from the capillary means and deposited into the sealed tubular member. In a preferred embodiment of the instant invention, the cushioning material 30 is inserted into the tubular member 14 just upstream of the insertion of at least one optical fiber 18 into the tubular member.

The capillary means or protective sheath 17 for inserting the at least one optical fiber 18 and the cushioning material 30 into the tubular member 14 comprises a first chamber or passageway 20 through which the optical fiber or fibers 18 pass and a concentric second chamber or passageway 32 for inserting the cushioning material 30. Chamber or passageway 20 has a pressure seal 22 with an inlet opening 24 at a first end. The optical fiber or fibers 18 enter the passageway 20 through the opening 24. At the opposite end of passageway 20 is an outlet opening 26. Passageway 20 and outlet 26 guide the optical fiber or fibers 18 and deposit or release the fiber or fibers 18 into the tubular member 14 preferably after the solder has solidified and the tubular member has been sealed. One advantage to releasing the fiber or fibers 18 into the tubular member after the sealing operation has been completed is that the risk of damage to the fiber or fibers as a result of the sealing operation is minimized. In a preferred method of assembling this type of optical fiber communication cable, the fiber or fibers 18 are inserted into the tubular member 14 downstream of the location where the cushioning material 30 has been injected or inserted into the tubular member 14. Although any suitable technique may be used, fiber or fibers 18 are preferably deposited into tubular member 14 by pulling the fiber or fibers from one end by any suitable means not shown in any suitable manner.

In a preferred embodiment, the chamber or passageway 32 for inserting cushioning material 30 into the tubular member concentrically surrounds the passageway 20. The cushioning material 30 enters the passageway 32 through an inlet opening 34, preferably while under pressure. The passageway 32 has an outlet opening or exit nozzle 36 through which the cushioning material 30 flows into the tubular member. Passageway 32 extends a distance sufficient to insure that the cushioning material 30 does not flow into the tubular member until after the solder has solidified. By waiting until after the solder has solidified and the tubular member 14 has been sealed to inject cushioning material 30 into the tubular member 14, any risk of the cushioning material adversely affecting the sealing operation or vice-versa is minimized and an improved seal may be effected. If cushioning material 30 were inserted before the sealing operation had been completed or before solder solidification, the cushioning material 30 could flow into the seam and adversely affect the sealing operation by preventing the solder from capillarying up into the seam interface.

The cushioning material 30 is preferably introduced into passageway 32 under pressure so that as the cushioning material 30 flows into tubular member 14, it substantially fills the tubular member 14 and substantially surrounds the optical fiber or fibers 18. Cushioning material 30 helps position the fiber or fibers 18 within tubular member 14. Any suitable mechanism not shown can be used to supply the cushioning material 30 under pressure to passageway 32. The cushioning material 30 is in part caused to flow through opening 36 by the motion of tubular member 14 and fiber or fibers 18. The movement of tubular member 14 and fiber or fibers 18 in the direction of arrow A creates a suction force on the cushioning material 30. This suction force helps draw the cushioning material 30 through opening 36 and into tubular member 14.

Although the cushioning material 30 may be introduced into passageway 32 in substantially any form and at substantially any desired temperature, it has been found to be desirable to insert the cushioning material 30 into the passageway 32 in a heated condition. This heated condition improves the flow-ability of the cushioning material 30 by making the cushioning material more fluid. As a result of this improved flowability, it is believed that the cushioning material can be drawn out of the nozzle 36 and into the tubular member at a lower suction force than that ordinarily required. Any suitable conventional heating device not shown may be used to heat the cushioning material 30 either before or after it enters the passageway 32.

In a preferred embodiment of the capillary means 17, passageways 20 and 32 are not coextensive. Preferably, the outlets 26 and 36 are arranged so that the cushioning material 30 enters the tubular member 14 upstream of the location where the release of the optical fiber or fibers 18 into the tubular member takes place.

If necessary, tubular member 14 may be passed through a die 50 for sizing the tubular member 14 to its exact desired dimension. Sizing die 50 preferably comprises a sinking die. If a sizing die is utilized, the optical fiber or fibers 18 are preferably inserted into the tubular member just prior to or simultaneously with the tubular member 14 passing through the sizing die 50.

By inserting the cushioning material 30 and the fiber or fibers 18 in the manner previously described, it is believed that the magnitude of the forces required to insert the cushioning material 30 and the fiber or fibers 18 into tubular member 14 may be reduced. By reducing these forces, the likelihood of damaging or kinking the optical fiber or fibers 18 during insertion is minimized.

Figure 5:
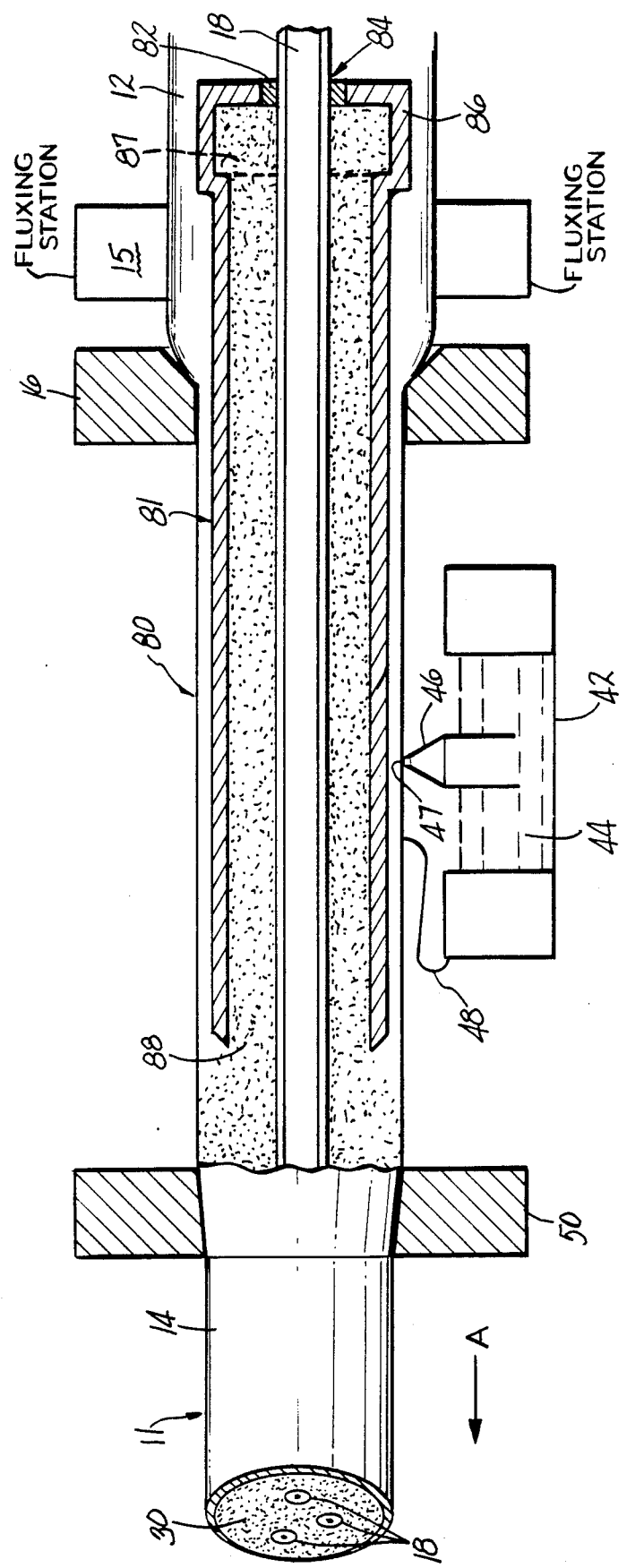
FIG. 5 is a schematic representation in partial cross section of a side view of a second embodiment of an apparatus used to assemble an optical fiber communication cable core having one or more optical fibers and a cushioning material.

In FIG. 5, an alternative embodiment of an apparatus 80 for assembling the cable core 11 is shown. As in the embodiment of FIGS. 1–3, a strip 12 of metal or metal alloy is pulled through a fluxing station 15 for applying a flux to the strip edges 40 and then through a die 16 for forming the tubular member 14. The tubular member 14 is then passed over a station 42 for sealing the seam 38.

After the tubular member has been sealed and the sealing material, i.e. solder, has solidified, the cushioning material 30 and the fiber or fibers 18 are inserted substantially simultaneously by the capillary means or protective sheath 81. The capillary means 81 preferably comprises a single passageway 86 having a pressure seal 82 with an inlet opening 84 at a first end. The optical fiber or fibers 18 enter the passageway 86 through the opening 84. On a sidewall of the passageway 86, preferably adjacent the seal 82, an inlet opening 87 is provided for supplying cushioning material 30 into the passageway 86. In a preferred arrangement, the pressure seal 82 and the inlet opening 87 are at a substantially right angle to each other. At the end of the passageway 86 opposed from pressure seal 82, an outlet opening 88 is provided.

The passageway 86 extends a sufficient distance into the tubular member that the fiber or fibers 18 and the cushioning material 30 are released into the tubular member 14 after the solder has solidified and the tubular member 14 has been completely sealed. As before, by waiting until after the solder has solidified and the tubular member 14 has been completely sealed to release the cushioning material 30 into the tubular member 14, any risk of damaging the cushioning material 30 or adversely affecting the sealing operation by cushioning material 30 seeping into the seam 38 is minimized.

While any suitable technique may be used, fiber or fibers 18 are preferably deposited into tubular member 14 by pulling the fiber or fibers 18 from one end by any suitable means not shown in any suitable manner. The cushioning material 30 is preferably inserted into passageway 86 while under pressure so that it substantially fills the tubular member 14 and substantially surrounds the optical fiber or fibers 18. The cushioning material 30 is also preferably inserted into passageway 86 in a heated condition so that the flowability of the cushioning material 30 is improved. It is desirable that the flowability of the cushioning material 30 be improved because while the fiber or fibers 18 move at substantially the same speed as the tubular member 14, the cushioning material 30 needs to flow at a greater speed since it has to fill the tubular member. It is also believed that this increased flowability also reduces the magnitude of the force needed to be exerted on the cushioning material to get it to flow into tubular member 14. The cushioning material 30 is in part caused to flow through the opening 86 by a suction force created by the motion of tubular member 14 and fiber or fibers 18.

If a sizing die 50 need be used, outlet opening 88 is preferably located substantially near the location of the sizing die. Again, sizing die 50 preferably comprises a sinking die. By positioning the outlet opening 88 at this location, it is believed that the magnitude of the forces required to insert the cushioning material 30 and the fiber or fibers 18 into tubular member 14 may be reduced.

Figure 6:
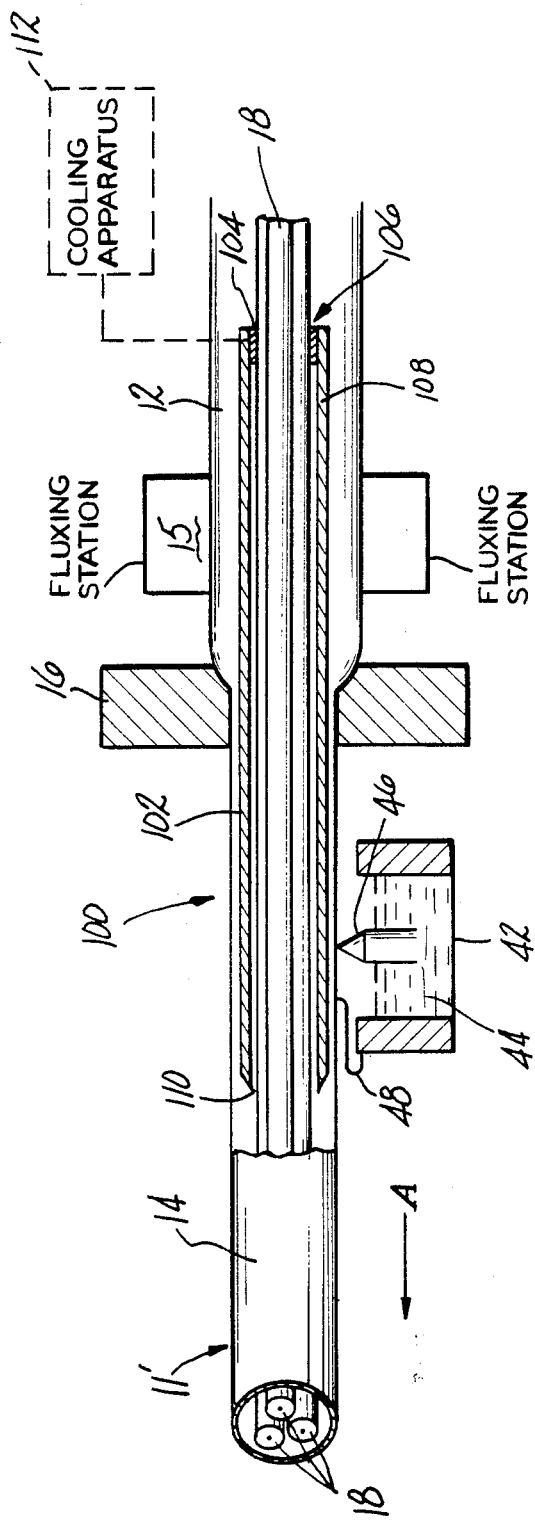
FIG. 6 is a schematic representation in partial cross section of an alternative embodiment of an apparatus for assembling an optical fiber communication cable core without any cushioning material.
Figure 7:
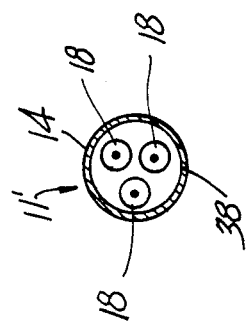
FIG. 7 is a schematic representation in cross section of an optical fiber communication cable core formed by the apparatus of FIG. 6.

For certain applications, it is not necessary to have a cushioning material surround the optical fiber or fibers within the cable core. FIG. 6 shows an alternative apparatus 100 for forming such a cable core 11'. The apparatus 100 is readily adaptable for inserting one or more optical fibers in an unconstrained condition into a closely surrounding tubular member.

As in the previous embodiments, a strip 12 of the metal or metal alloy is pulled through a fluxing station 15 for applying a flux to the strip edges 40 and then through a die 16 for forming the tubular member 14. The tubular member 14 is then passed over a station 42 for sealing the seam 38.

After the tubular member has been sealed and the sealing material, i.e. solder, has solidified, the fiber or fibers 18 are inserted or released into the tubular member by capillary means or protective sheath 102. The capillary means 102 comprises a single passageway 108 having a seal 104 with an inlet opening 106 at a first end. The optical fiber or fibers 18 enter the passageway 108 through the opening 106. At the end of the passageway 108 opposed to the seal 104 is outlet opening 110. The passageway 108 extends a sufficient distance into the tubular member that as the fiber or fibers 18 emerge from the opening 110, the fiber or fibers are released into the member 14 after the solder has solidified and the tubular member 14 has been completely sealed. The capillary means or protective sheath 102 minimizes the possibility of the sealing operation damaging the optical fiber or fibers.

While any suitable technique may be utilized, the fiber or fibers 18 are preferably deposited into tubular member 14 by pulling the fiber or fibers 18 from one end by any suitable means not shown in any suitable manner. If needed, apparatus 100 may be provided with a sizing die not shown for providing cable core 11' with a particular outer dimension.

It is desirable that the capillary means or protective sheath 17, 81, and 102 be made from a material having certain properties. First, the material should not be bondable to the metal or metal alloy forming member 14. If the material were bondable, the sealing operation could bond the capillary means to the member 14. Second, the material should be able to withstand the temperatures associated with the sealing operation and, therefore, should have good high temperature properties. Finally, the material should have high strength characteristics and should have a relatively low thermal conductivity. By providing a material having a relatively low thermal conductivity, little or substantially none of the heat created during the sealing operation will be transmitted to the optical fiber or fibers and/or any filler material. Suitable materials out of which the capillary means or protective sheath may be fabricated include refractory alloys such as high-nickel alloys, ceramic materials, high stainless steels, sapphire, insulating type materials and composites comprising an outer material having a relatively low thermal conductivity and an inner material having a higher thermal conductivity than the outer material. It should be recognized that the aforementioned materials are exemplary and should not be limiting in any way. Other suitable materials may be used.

In certain high temperature situations, it may be desirable to provide the capillary means or protective sheath with a cooling arrangement. In this way, each optical fiber and/or any cushioning material may be additionally protected from heat generated during the sealing operation. Cooling could be provided in any suitable conventional manner. For example, the capillary means or protective sheath could be connected to an external cooling apparatus 112. Cooling apparatus 112 may comprise any suitable conventional cooling apparatus known in the art. Cooling could be provided to any or each passageway of the capillary means or protective sheath. In situations where it is desirable to provide cooling, it would be advantageous to form the capillary means or protective sheath out of a composite material as discussed above. The higher thermally conductive inner material could be connected to the cooling apparatus while the outer material performs its protective function.

The cable core 11 or 11' may contain any desired number of optical fibers 18. In a preferred embodiment, one to six optical fibers are located within the cable core. Preferably, each optical fiber 18 comprises a photo-conductor glass rod; however, any suitable optical fiber may be used in the cable.

While any suitable technique may be used to deposit the fiber or fibers into the tubular member 14, it is preferred to deposit the fiber or fibers by pulling from one end without applying any significant back tension. Since each fiber 18 remains substantially unconstrained during the tubular member forming operation, each fiber is under substantially zero tension at the same time that the tubular member 14, as a result of the core formation process, is near maximum elastic tension. By doing this, it is possible to put each fiber in static compression after unloading so that an increment of plastic strain in the sheathing equal to the net static compression could be imposed without kinking the fiber or fibers 18.

Alternatively, if desired, the optical fiber or fibers 18 may be helically wound within the cable core 11 or 11'.

Cushioning material 30 may comprise any suitable non-setting void filler. The temperature to which the cushioning material is heated depends upon the selected filler and its viscosity characteristics. In a preferred embodiment, cushioning material 30 comprises a gel which is initially introduced into its passageway at a temperature in the range of about 35° C. to about 150° C., preferably at about 100° C. A suitable filler which may be used for cushioning material 30 is "PENRECO FW" made by Penreco of Bulter, Pa.

The use of cushioning material 30 is highly desirable in a cable which may be subjected to high bending or hydrostatic stresses. Cushioning material 30 has two primary functions. First, it lubricates the fiber or fibers 18 to prevent stiction and microbending. Second, it provides the fiber or fibers 18 with a hydrostatic, ambient pressure environment.

Strip 12 which is used to form tubular member 14 preferably has an initial width greater than the outside circumference of the tube formed by forming die arrangement 16. The initial width is about 5% to about 15%, preferably about 10%, greater than the tube outside circumference. By starting with such an initial strip, the seam 38 created during tube forming will be put into significant compression, thereby remaining substantially closed even if spring back occurs. If it is desired to form a mechanical interlock joint, the edges 40 of strip 12 may be shaped in any suitable manner so that a mechanical seal is formed along seam 38 during tube forming.

The material comprising strip 12 and tubular member 14 should possess certain conductivity, strength, and thickness-to-diameter ratio characteristics. The material should possess a high electrical conductivity since member 14 preferably acts as a conductor in the final cable. In the cable system, tubular member 14 may be used to carry current between repeaters not shown which may be spaced about 25 km. apart.

Since member 14 is preferably the only metal component in the cable, the material should possess high strength properties. The material preferably possesses significant yield strength and a relatively high yield strain. The member should be formed from a material that has a yield strength sufficient to keep the tubular member in a substantially elastic state for any degree of cable bending. By having a member that is maintained in a substantially elastic state and substantially never in a plastic state, the risk of breaking the glass fiber or fibers due to placing the glass fiber or fibers in tension is minimized.

A material having a relatively high yield strain is important since it reduces the overall cable diameter. The yield strain of the material forming the tubular member also determines how much of the ultimate strength of an outer loadbearing layer can be used without permanently straining the tubular member and breaking the optical fiber or fibers.

The material used to produce tubular member 14 should also be capable of sustaining certain coiling forces during fabrication and installation. Therefore, a thickness-to-diameter ratio K which indicates good formability characteristics is required. If the material does not possess good formability characteristics, the tubular member wall may be crinkled or buckled during tube formation. If this occurs on the inner surface of the member, optical fiber or fibers 18 may suffer microbending against angular surfaces and large increases in attenuation may result.

A preferred strip material has a conductivity in the range of about 25 to 102% IACS, a yield strength in the range of about 30 to about 90 ksi, preferably in the range of about 50 ksi to about 60 ksi, a yield strain in the range of about 0.0017 to 0.0095 and a thickness-to-diameter ratio of about 0.02 to 0.50. A number of metals and alloys possess the required combination of strength, conductivity, and thickness-to-diameter ratio and may, therefore, be utilized. In a preferred embodiment, the material forming strip 12 and tubular member 14 comprises a copper/zirconium alloy, designated copper alloy 151, manufactured by Olin Corporation. Copper alloy 151 has a conductivity of about 95% IACS, a yield strength of about 62 ksi, a yield strain of about 0.0034 and a thickness-to-diameter ratio of about 0.15.

Since the strip is being pulled through a fluxing station, a forming die and/or a sizing die, a slightly harder material is desirable in order to avoid strip breakage. The material selected should have a hardness of at least about ¼ hard. Copper alloy C15100 can be hardened to meet this requirement. In a preferred embodiment, copper alloy C15100 has a hardness in the range of about at least ¼ hard to about spring. It has been found that a tubular member formed from copper alloy C15100 in this hardness range is particularly suitable for situations where an outer layer or layers is to be fabricated about the cable core using high temperature fabrication techniques.

After cable core 11 or 11' has been assembled utilizing either apparatus 10, apparatus 80, or apparatus 100, the cable core may be surrounded by one or more additional layers. For example, dielectric layer 56 may be fabricated about the member 14. A typical cable will have such a dielectric layer if the tubular member 14 is to be used as an electrical conductor. Dielectric layer 56 may be fabricated in any suitable conventional manner using any suitable conventional apparatus. For example, dielectric layer 56 may be extruded about the cable core by any suitable extruding arrangement 72 in a conventional manner. The dielectric layer 56 preferably comprises a high density polyethylene, although any suitable material may be used. The dielectric layer preferably takes no part in system telemetry and acts only as an insulator. However, if desired, it may be designed to take part in the system telemetry. If tubular member 14 is not used as an electrical conductor, the dielectric layer 56 may be omitted.

As shown in FIG. 4, the cable may be provided with a loadbearing layer 58. If a dielectric layer 56 is provided, the loadbearing layer is preferably fabricated about it. The loadbearing layer serves as the primary tensile element in the cable, although some fraction of the total load is carried by tubular member 14. This layer also acts as an abrasion-resistant layer which completely covers and protects cable core 11. Any suitable material such as polyethylene, polyamides, polyimides, epoxies, and other similar plastic materials may be used for the layer 58. In a preferred embodiment, this layer comprises a contrahelix of plastic filaments sold under the trademark KEVLAR by DuPont contained in a matrix of thermosetting epoxy. The fabrication of this layer may be done in a known manner by any suitable fabrication device 74, i.e. fabricating an annulus utilizing a die arrangement.

The cable is generally provided with an outer covering 60. The outer covering 60 serves as a barrier to water intrusion and defocuses external cutting or abrading forces. The outer covering 60 may be formed from any suitable material such as an elastometric material. The outer covering 60 may be fabricated in any well known manner by any conventional apparatus known in the art. For example, outer covering 60 may be extruded in a conventional manner by a conventional extrusion apparatus 76. In a preferred embodiment, covering 60 comprises a layer of black polyurethane. FIG. 4 shows an embodiment of a finally assembled cable 70.

While any suitable solder may be used to seal tubular conductor 14, it has been found that when a fabrication technique for forming one or more of the additional layers about cable core 11 uses high temperatures, it is desirable to use a high temperature solder such as a silver solder.

The optical fiber communication cable generated by the instant invention theoretically can have a substantially infinite length. Cable lengths of about 25 km. between repeaters can be fabricated by the instant method and apparatus.

The optical fiber communication cable assembled by the instant invention may have any desired diameter; however, the instant invention is particularly suited for assembling a cable having a relatively small diameter. The tubular member 14 may have any desired inner and outer diameters. For example, it may have an inner diameter in the range of about 0.17 cm to about 0.25 cm and an outer diameter of about 0.24 cm to about 0.35 cm. In a preferred embodiment, where the tubular member is made from copper alloy 151, the inner diameter of member 14 is about 0.1823 cm and the outer diameter of member 14 is about 0.2604 cm. The overall diameter of the cable produced by the instant invention may be in the range of about 0.821 cm to about 0.977 cm. In the preferred embodiment having a tubular member of copper alloy 151, the overall cable diameter is about 0.9267 cm.

Strip 12 used to produce tubular member 14 may have any suitable configuration. For example, strip 12 could have a trapezoidal shape.

Assembling an optical fiber communication cable in accordance with the method of the instant invention has several advantages. First, the optical fiber or fibers and/or the cushioning material may be inserted into the tubular member at reduced pressure thereby reducing the likelihood of breaking, kinking, or damaging the optical fiber or fibers. Second, the tubular member can be formed with an effective seal providing a high degree of hermeticity. Third, the tubular member can be formed so that it has a relatively small diameter, thereby reducing the overall cable diameter.

The cable produced by the instant invention can be used in both underground, aboveground, and undersea communication applications. For example, it could be used to supply data support and power to a deep sea sensor. It could also be used for underground, aboveground, and undersea telephone applications.

While the tubular member has been described in a preferred embodiment as being formed from copper alloy 151, it may be formed from any metal or metal alloy exhibiting the desired conductivity, strength, and formability characteristics.

While the mechanism for sealing the tubular member has been described in terms of a particular soldering operation, any suitable soldering, brazing or welding technique may be used. For example, the sealing operation may be performed using a high intensity welding or laser apparatus.

While the first embodiment of the capillary means for releasing the cushioning material and the fiber or fibers into the tubular member has been shown as having concentric passageways with different lengths, the capillary means may be modified so that the concentric passageways have substantially the same length and substantially simultaneously release the cushioning material and the fiber or fibers into the tubular member. In addition, the capillary means 17 may be modified if desired so that the passageways are nonconcentric. Furthermore, the passageway or passageways of the various capillary means or protective sheath embodiments may have any desired cross-sectional shape and any desired longitudinal configuration and extent.

While the optical fiber communication cable is shown as having a dielectric layer, a loadbearing layer and an outer covering, any number of protective layers may be fabricated about the core.

The U.S. patents and patent application, publications and papers set forth in this application are intended to be incorporated by reference herein.

It is apparent that there has been provided with this invention a novel method of assembling an optical fiber communication cable which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. An apparatus for assembling an optical fiber communication cable, said apparatus comprising:
   die means for forming a tubular member having a substantially downwardly facing seam from a strip of metal or metal alloy;
   means for soldering said substantially downwardly facing tubular member seam to provide a sealed tubular member; and
   means for depositing at least one optical fiber into said sealed tubular member after said seam has been soldered, said depositing means protecting said at least one optical fiber during said soldering.

2. The apparatus of claim 1 further comprising:
   said depositing means including means for depositing a cushioning material into said sealed tubular member after said soldering has been completed, said cushioning material surrounding each said optical fiber.

3. The apparatus of claim 2 wherein said depositing means comprises means for depositing said cushioning material into said sealed tubular member before inserting said at least one optical fiber.

4. The apparatus of claim 2 wherein said depositing means comprises means for substantially simultaneously inserting said at least one optical fiber and injecting said cushioning material into said sealed tubular member.

5. The apparatus of claim 4 wherein said depositing means comprises a single passageway through which both said cushioning material and said at least one optical fiber pass.

6. The apparatus of claim 2 wherein said depositing means comprises:
   a first passageway through which said at least one optical fiber passes, said first passageway having a first outlet through which said at least one optical fiber passes into said tubular member; and
   a second passageway through which said cushioning material flows, said second passageway having a second outlet through which said cushioning material flows into said tubular member.

7. The apparatus of claim 6 further comprising:
   said first and second passageways having different lengths; and
   said first and second outlets being arranged so that said cushioning material flows into said tubular member upstream of the insertion of said at least one optical fiber into said tubular member.

8. The apparatus of claim 2 further comprising:
   said depositing means extending into said tubular member downstream of said soldering means.

9. The apparatus of claim 1 further comprising:
   said depositing means extending into said tubular member downstream of soldering means.

10. The apparatus of claim 1 further comprising:
    said depositing means being fabricated from a material that is unbondable to said tubular member and that has a relatively low thermal conductivity,
    whereby heat created during said soldering operation does not adversely affect said at least one optical fiber.

11. The apparatus of claim 10 wherein said material is selected from the group consisting of refractory alloys, stainless steels, ceramics and insulating materials.

12. The apparatus of claim 10 wherein said material comprises a composite material, said composite material having an outer layer comprising a first material with a relatively low thermal conductivity and an inner layer comprising a second material with a conductivity higher than said first material.

13. The apparatus of claim 1 wherein said soldering means comprises:
   a source of solder; and
   solder head means for forming a spout of solder so that as said tubular member and said seam pass over said spout, said solder capillaries into said seam and thereby seals said tubular member.

14. The apparatus of claim 1 further comprising:
   means for fabricating a dielectric layer around said member;
   means for fabricating a loadbearing layer around said dielectric layer; and
   means for fabricating an outer covering around said loadbearing layer.

15. The apparatus of claim 1 further comprising:
   means for cooling said depositing means.

16. The apparatus of claim 1 further comprising:
   means for applying flux to edges of said strip prior to said strip being formed into said tubular member.

17. The apparatus of claim 1 wherein said depositing means comprises means for depositing each said fiber into said tubular member in an unconstrained manner.

18. The apparatus of claim 1 wherein said depositing means comprises means for depositing a plurality of said fibers into said tubular member.

19. An optical fiber communication cable comprising:
   a drawn high strength copper alloy tube having a generally longitudinally extending seam, said seam being formed generally facing downwardly and having edges in relatively close proximity;
   a solder material substantially filling said seam and bonding said generally downwardly facing edges together for providing a substantially sealed tube; and
   at least one optical fiber within said tube, said at least one optical fiber being inserted into said tube after said solder material has solidified.

20. The cable of claim 19 further comprising:
   a cushioning material located within said tube, said cushioning material substantially surrounding said at least one optical fiber; and
   said tube forming an electrical conductor.

21. The cable of claim 20 further comprising:
   at least one external layer surrounding said tube.

22. An apparatus for assembling an optical fiber communication cable, said apparatus comprising:
   die means for forming a tubular member having a substantially downwardly facing seam from a strip of metal or metal alloy;
   means for substantially filling said substantially downwardly facing seam with a sealing material to form a sealed tubular member; and
   means for depositing at least one optical fiber into said sealed tubular member after said seam has been substantially filled, said depositing means protecting said at least one optical fiber during said seam filling.

23. The apparatus of claim 22 wherein said filling means comprises means for soldering said seam.

24. The apparatus of claim 22 wherein said filling means comprises means for substantially filling said seam with a brazing material.

25. A method of assembling an optical fiber communication cable, said method comprising:
   providing a strip of metal or metal alloy;
   providing at least one optical fiber;
   forming a tubular member having a substantially downwardly facing seam from said strip of metal or metal alloy;
   soldering said substantially downwardly facing seam to form a sealed tubular member; and
   depositing said at least one optical fiber into said sealed tubular member after said soldering step has been completed so that the likelihood of damaging said at least one optical fiber is reduced.

26. The method of claim 25 further comprising:
   providing a material for cushioning said at least one optical fiber; and
   depositing said cushioning material into said sealed tubular member after said soldering step has been completed so that said cushioning material does not adversely affect said soldering of said seam.

27. The method of claim 26 wherein:
   said step of depositing said cushioning material into said sealed tubular member occurs prior to said step of depositing said at least one optical fiber into said sealed tubular member so that said cushioning material substantially surrounds and positions said at least one optical fiber.

28. The method of claim 26 wherein:
   said step of depositing said cushioning material into said sealed tubular member occurs substantially simultaneously with said step of depositing said at least one optical fiber into said sealed tubular member.

29. The method according to claim 26 further comprising:
   heating said cushioning material to increase its flowability prior to said step of depositing said cushioning material into said sealed tubular member.

30. The product formed by the method of claim 26.

31. The method of claim 25 wherein said step of forming said tubular member comprises:
   providing die means for forming said member; and
   pulling said strip through said die means.

32. The method of claim 31 further comprising:
   providing means for applying a flux to edges of said strip; and
   pulling said strip through said flux applying means prior to said step of pulling said strip through said die means.

33. The method of claim 25 wherein said step of soldering said seam comprises:
   providing a source of solder and a soldering head having an orifice;
   forming a spout of solder by passing said solder through said soldering head and orifice; and
   passing said tubular member and said downwardly facing seam over said solder spout and causing said solder to flow into said downwardly facing seam.

34. The method of claim 25 further comprising:
   fabricating a dielectric layer around said tubular member;
   fabricating a loadbearing layer around said dielectric layer; and
   fabricating an outer covering around said loadbearing layer.

35. The method of claim 25 wherein said step of providing a strip of metal or metal alloy comprises:
   providing a material consisting essentially of copper.

36. The method of claim 25 wherein said at least one optical fiber depositing step comprises:
depositing a plurality of said fibers into said tubular member.

37. The method of claim 25 further comprising:
depositing each said optical fiber into said tubular member in an unconstrained condition.

38. The method of claim 25 further comprising:
providing capillary means for depositing said at least one fiber into said tubular member and for protecting said at least one fiber during said soldering in its place step; and
forming said tubular member about said capillary means.

39. The method of claim 38 further comprising:
forming said capillary means from a material that will not bond to said tubular member during said sealing step and that has a relatively low thermal conductivity so that heat created during said sealing step will not adversely affect said at least one optical fiber.

40. The method of claim 38 further comprising:
flowing a cushioning material through said capillary means into said tubular member.

41. The method of claim 38 further comprising:
cooling said capillary means.

42. The method of claim 25 wherein said tubular member forming step comprises:
forming a tubular electrical conductor.

43. The product formed by the method of claim 25.

44. The method of claim 25 wherein said soldering step comprises:
providing a source of solder; and
passing said tubular member and said seam over said solder source so that said solder substantially fills said seam.

45. A method of assembling an optical fiber communication cable, said method comprising:
forming a tubular member having a substantially downwardly facing seam from a strip of metal or metal alloy;
substantially filling said substantially downwardly facing seam with a sealing material to form a sealed tubular member; and
depositing at least one optical fiber into said sealed tubular member after said seam has been substantially filled so that the likelihood of damaging said at least one optical fiber during cable assembly is reduced.

46. The method of claim 45 wherein said filling step comprises soldering said seam.

47. The method of claim 45 wherein said filling step comprises substantially filling said seam with a brazing material.

* * * * *